Jan. 2, 1923.
C. H. BLISS.
CONTINUOUS BRICK MOLDING MACHINE.
FILED JAN. 27, 1921.
1,440,715.
3 SHEETS—SHEET 1.
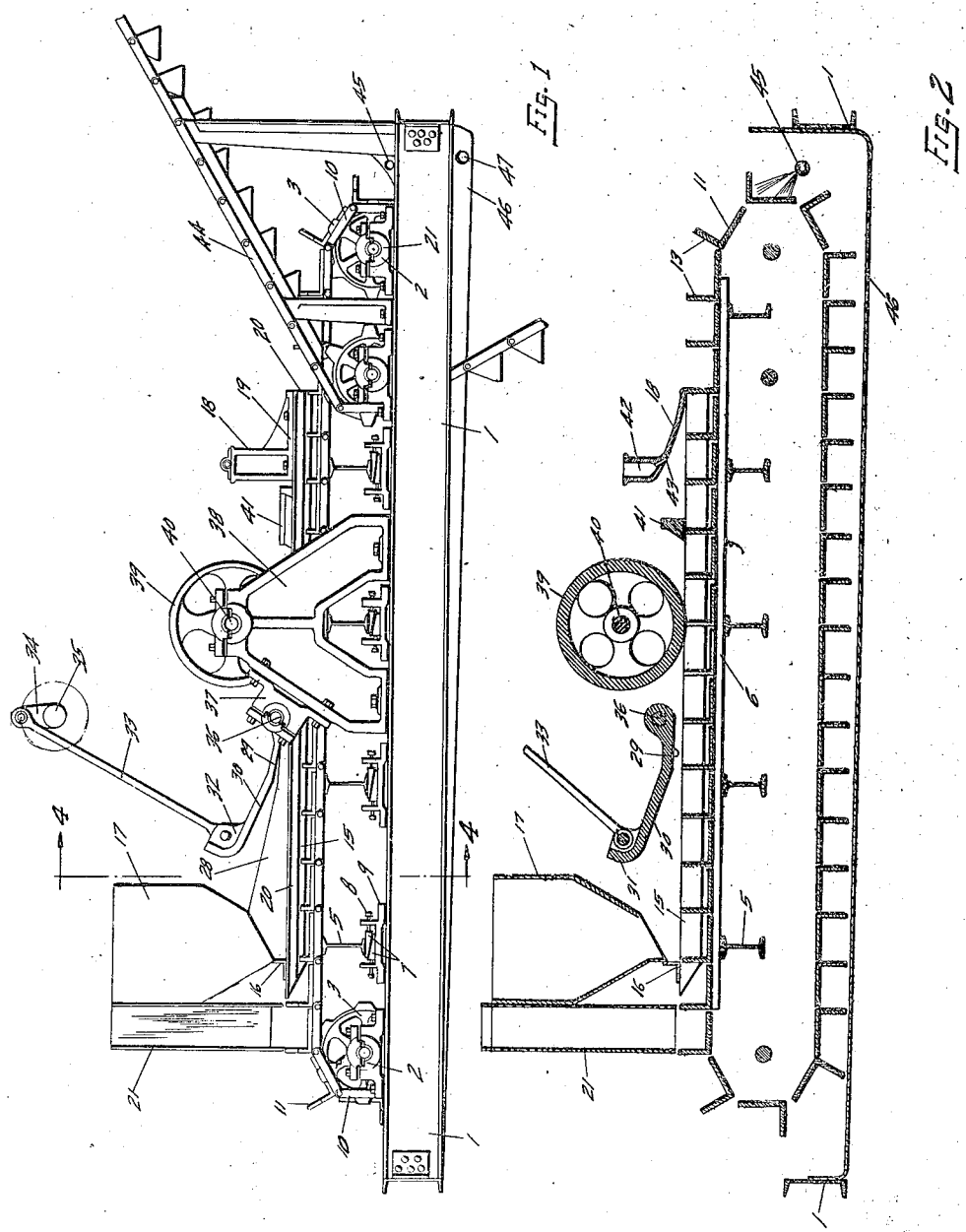
INVENTOR
Clyde H. Bliss
BY
ATTORNEY

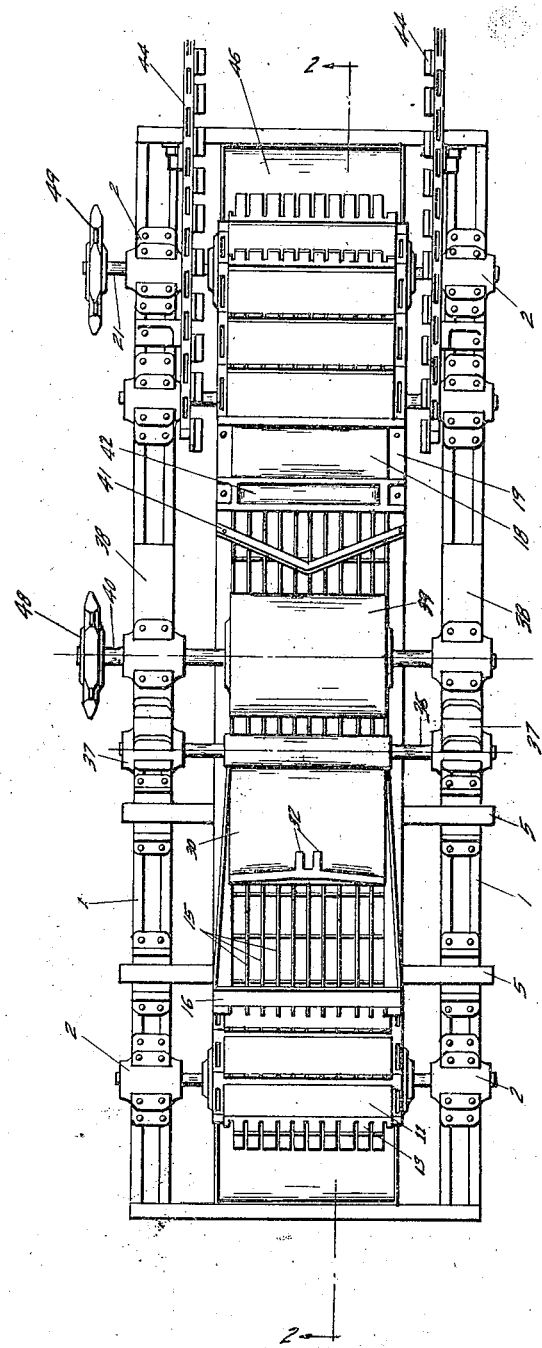

Jan. 2, 1923.
C. H. BLISS.
CONTINUOUS BRICK MOLDING MACHINE.
FILED JAN. 27, 1921.
1,440,715.
3 SHEETS—SHEET 3.
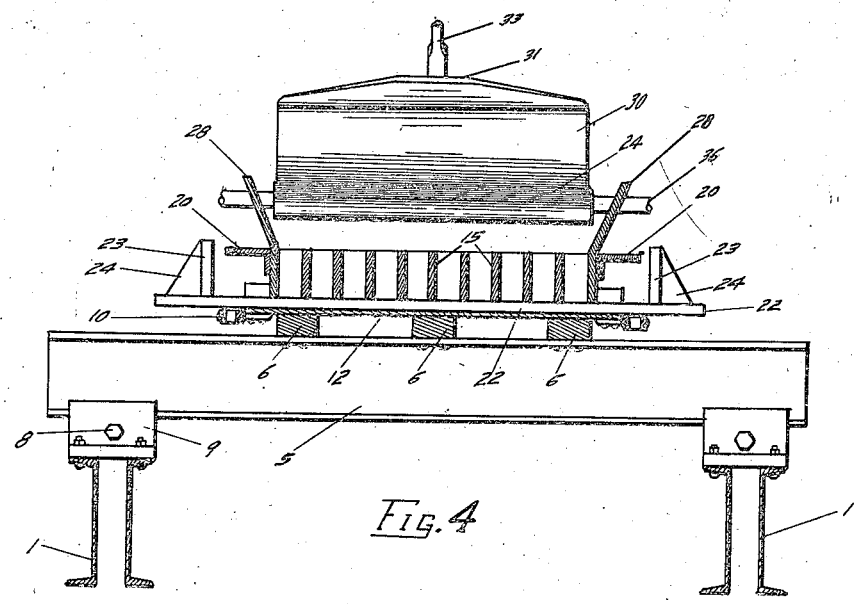
Fig. 4
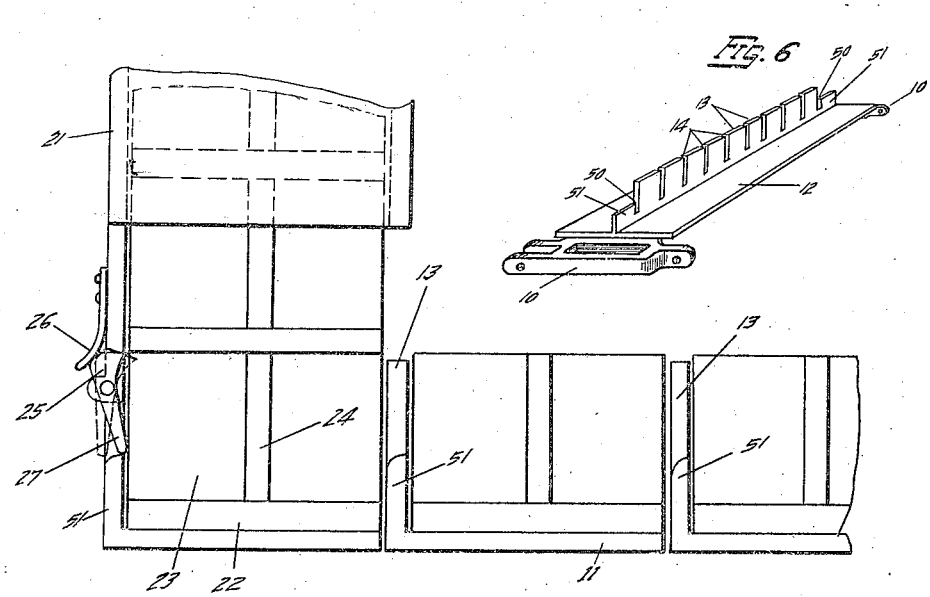
Fig. 5
Fig. 6
INVENTOR
Clyde H. Bliss
BY
ATTORNEY Patented Jan. 2, 1923.

1,440,715

UNITED STATES PATENT OFFICE.

CLYDE H. BLISS, OF BIRMINGHAM, ALABAMA.

CONTINUOUS BRICK-MOLDING MACHINE.

Application filed January 27, 1921. Serial No. 440,286.

*To all whom it may concern:*

Be it known that I, CLYDE H. BLISS, a citizen of the United States of America, residing at Birmingham, in the county of Jefferson and State of Alabama, have invented certain new and useful Improvements in Continuous Brick-Molding Machines, of which the following is a specification.

My invention relates to a continuous machine for the quantity production of brick and especially brick formed from a concrete or cementitious mixture.

The chief object of my invention is to produce a machine which, by performing automatically the following operations, will reduce to a minimum the labor incident to the production of bricks in great quantity, the automatic operations being in their order; a feed of the pallets to the flights; the discharge of the mixture onto the traveling pallets; the preliminary and graduated tamping of the mixture on the pallets between stationary dividing blades; the rolling of the mixture to definitely compress it into the forms; the scraping off of any surplus rolled material to standardize the size; the troweling of the face of the brick by a smoothing iron working with a film of water on its smoothing face; the stripping of the bricks on the pallets from the molds in such manner as to trowel the ends of the brick; and finally the cleaning, spraying and washing of the flights, thus completing automatically and mechanically the cycle incident to the production and delivery of the molded brick on pallets to be conveyed to a drying apparatus.

Among the more distinctive features of my invention, are

1st: The provision of automatic means to feed the pallets onto the flights in advance of the hopper so that the mixture is received on the pallets and the brick is finished complete thereon.

2nd: The shaping of the tamper to exert a graduated effect upon the mixture so as to bring it gradually to the level desired preliminary to its final compression by the roller.

3rd: The insertion of a V-shaped scraper blade immediately behind the roller for the purpose of stripping cleanly any excess material on the brick or molds.

4th: The provision of a stationary smoothing iron preferably having a film of water fed to its working face so as most effectively to trowel and smooth the top face of the brick.

5th: The provision of any suitable means for mechanically stripping the pallets from the flights in such manner as to cause the ends of the brick to be troweled.

6th: The mounting of the entire mechanism on a frame so that it can be transported and set up as a unit.

7th: The provision of novel means for compensating the wear of the flights as they travel over their guides on the upper level.

8th: The provision of a collecting basin in the supporting frame for the collection of the spraying and washing liquid utilized to clean the flights; and 9th: The novel and improved design of the flights, each having its vertical slotted wall set in its center to avoid a tendency to tip.

My invention further comprises the novel details of construction and arrangements of parts, which in their preferred embodiment only are illustrated in the accompanying drawings, in which:—

Fig. 1 is a side elevation of my complete apparatus.

Fig. 2 is a longitudinal cross section taken on the line 2—2 of Fig. 3.

Fig. 3 is a plan view of Fig. 1.

Fig. 4 is a sectional view taken on the line 4—4 of Fig. 2.

Fig. 5 is an enlarged detail view of the flights and pallets with the automatic pallet feed mechanism shown in elevation.

Fig. 6 is a detail perspective view of the preferred type of flight.

Similar reference numerals refer to similar parts throughout the drawings.

In the form illustrated, my complete apparatus is mounted upon a structural bed frame formed by standard structural metal channels 1 suitably connected at their corners to form a rectangle upon the side of which are mounted end bearings 2 for the sprocket wheels 3 and intermediate supports for the transverse I-beams 5 which support the tracks 6 upon which the flights travel in traversing the upper level. These several I-beams 5 are each adjustably supported at each end by a pair of wedge blocks 7 which are adjustable by set screws 8 in a box 9 mounted on the base frame. By adjusting the set screws the I-beams 5 can be raised to compensate the wear of the flights on their upper tracks. The sprocket wheels 3 are arranged in pairs at each end of the frame and the aligning sprocket wheels at each side drive an endless chain formed of links 10. To each link is suitably connected a flight, which may be the L-shaped flight 11, as seen in Figs. 1 to 3, but which is preferably the T-shaped flight 12 shown in Fig. 6. Each flight comprises a vertical wall 13 provided with a plurality of equi-distantly spaced slots 14 and arranged either at one side of the flights, or in the preferred form in Fig. 6; it is arranged centrally, the advantage of the latter arrangement being that the pressure of the tamping and rolling mechanisms will not tend to tilt or cock the flight. The several dividing blades 15 are rigidly attached at their forward ends to a cross angle 16 which in turn is attached to a hopper 17 containing the concrete or cementitious mixture, which hopper is suitably supported overhead by any suitable means (not shown) in rigid relationshp with the mechanism on the frame 1. At their rear ends the several dividing blades are anchored to a smoothing iron 18 by being bolted, rivetted or otherwise attached thereto, and this iron is attached by its end flanges 19 to angles 20 (see Fig. 4) which are attached to the outside dividing blades, and in this manner the several blades are properly and rigidly spaced and held in assembled relationship at their front and rear ends.

At the left hand end of the flights (see Fig. 1), I provide a vertical pallet chute 21 which is preferably attached to the hopper 17 but may have any other suitable support. This chute is wider than the flights and has therein a series of superimposed pallets comprising each a flat bottom board 22 having transverse vertical end boards 23 which are held rigid thereon by inclined braces 24. The pallets in the chute are supported in part by a sliding engagement of the bottom board of the lowermost pallet on the end boards 23 of the pallet resting on and moving with the flight beneath the chute, and in part by the latches 25 normally pressed into the chute by flat springs 26 so that they will engage and support the left hand edge of the bottom board 22 of the pallet next above it, and each of these latches is provided with a pendent tail-piece 27 which is disposed at a level to be engaged and tripped by the incoming flight, which, as indicated in Fig. 5, moves them to full line position in which they release the stack of pallets and permit them to drop, thus depositing the lowermost pallet into position on the flight below the chute, and as soon as this flight has moved substantially the latches are released and are again moved by their springs into position to co-operate with the moving pallet last deposited on the flights to support the pallets above it in the chute. In this manner the pallets are automatically fed to the flights and the flights thus pass into position below the hopper with the pallets resting thereon.

The hopper 17 is provided with a bottom opening inclined in the direction of the travel of the flights and this opening is flanked on either side by side guide walls of wings 28 which are formed as parts of the forward ends of the outside dividing blades 15 but which need not be integral with such dividing blades. These side wings 28 slope inwardly and slant downwardly from the hopper so as to form a guide for the unpacked material as it flows by gravity onto the pallets from the hopper 17. This material is first acted upon by a tamping mechanism which will now be described.

The tamping mechanism comprises a transverse tamping plate comprising a horizontal base portion 29; an upwardly inclined body portion 30, and an upwardly curved end edge 31; the latter being provided with lugs or ears 32 between which the lower end of a pitman rod 33 is pivoted. The upper end of this rod 33 is connected to an overhead crank 34 driven by a crank shaft 35 having any suitable support and driven by any suitable source of power. The tamping plate is mounted fast on a shaft 36 adapted to rock in bearings 37 attached to the side of the main roller bearing frames 38 and will rock from its lowermost position, shown in Fig. 2, to its upward position shown in Fig. 1. In doing this it will be observed that the upwardly inclined body portion 30 of the tamper will first tamp the material, gradually compressing it as the material is fed to the right on the flights until it reaches the portion 29 of the tamper where the maximum leverage and the greatest tamping pressure is exerted. The rolled edge 31 of the tamping plate serves to materially brace and strengthen its forward edge at which point the power is applied. Having thus gradually tamped the material down to a predetermined level the pallets are next caused to pass under a large compression roll 39 fast on a shaft 40 which turns in suitable bearings in the frames 38 which are mounted on the main frame 1 with their bases bifurcated to straddle the supports for the I-beam 5 under the roller. This roller is set to compress the tamped material flush with the top of the molds. Immediately in the rear of this roller I arrange a V-shaped scraping blade 41 set to scrape any excess material from the top of the molds and from the top of the flights, thus bringing the top faces of the finished bricks to a true surface. The scraping blade is attached to the several dividing blades 15 and is held thereby in position.

The smoothing mechanism comprises the plate 18 which as shown is caused to gradnally slope downwardly toward the right (Fig. 1) and is provided across its upper edge with a reservoir 42 adapted to contain water which is fed therefrom through a series of small ports or orifices 43 so as to flow in a thin film over the entire downwardly sloping face of the smoothing iron and this film of water, in conjunction with the plate, will trowel off and finish the top faces of the brick, which when they leave the smoothing iron are finished on their pallets ready to be removed.

In order to trowel or finish the ends of the brick and to remove them automatically from the flights, I provide an endless carrier 44 disposed on upwardly inclined guides and having its rate of travel so proportioned to that of the flights that it will gradually lift the pallets successively from between the walls 13 of the adjacent flights with a true parallel movement relatively to said walls and in this manner the brick as they slip vertically between the walls 13 are troweled or finished at their ends and leave the machine complete and troweled on all surfaces except the edge resting on the pallet. After the pallets have been stripped from the flights, the latter commence to round the right hand sprocket wheels 3 and, in doing so come, successively into position in front of a transverse spray pipe 45 disposed so to direct jets of any suitable cleansing or lubricating fluid so as to wash and clean the flights and to lubricate the chains. This washing liquid is caught in a tank 46 which extends throughout the space within the frame 1 and is sloped towards one end for drainage through any suitable outlet, such as 47.

The shaft 40 is provided with a sprocket 48 and the shaft for the right hand sprockets 3 is provided with a driving sprocket 49, the sprocket 49 being driven clockwise and the sprocket 48 counter-clockwise, and both sprockets being driven preferably from above by any suitable power means (not shown).

By reference to Fig. 6, showing the preferred type of flight, it will be observed that I provide at each end of its slotted wall 13 a notch 50 which is intended to receive the lower edge of the adjacent outside dividing blade 15 and thus hold them against bulging outwardly during the compacting operations. The outer ends of the walls 31 are cut down to clear the angles 20, which brace the top edges of the outside division plates, and in this way each wall is provided with ledges 51 rounded overhead and utilized to engage and trip the latches 25 which are disposed out of the path of the main body portions of the walls 13. These ledges 51 and grooves 50 are provided in the walls 13 of both styles of flights.

*The operation.*—Assuming the flights to be driven so that they move from left to right along their upper level and that the chute 21 is filled with pallets and the hopper 17 charged with the desired mixture, the method of manufacturing the bricks is as follows. As each flight moves into position under the pallet hopper 21 it receives its respective pallet and moves with it under the hopper 17 from which the material or mixture falls onto the pallet, being subdivided by the division blades 15. As the flights continue to advance towards the right the material is brought under the tamping plate and is gradually compressed and then in turn is brought under the compression roll and is rolled down to the top level of the division blades, after which the V-shaped blade 41 scrapes and removes any surplus material and the pallets advance under the smoothing iron 18 where the top dress is given the bricks, after which the pallets are lifted from between the parallel flight walls 13 and the end edges of the bricks are troweled. The pallets, with the finished bricks, are conveyed off for subsequent treatment by conveyor 44 and the flights, after being washed, are returned to pallet receiving position. In all of this operation no manual labor is required except a general supervision of the machine and when there is evidence of any wear in the tracks 6, upon which the flights travel, this is compensated for by the adjustment of the wedge blocks 7 under the cross supporting I-beams 5. The apparatus as a whole, with the exception of its overhead drive, hopper and chute, are self contained on the structural iron base 1 and can be handled, transported and set as a unit. Moreover, practically all of the material used in the apparatus is of standard character so that but few special parts are required.

Having thus described my invention, what I claim as new and desire to secure by Letters Patent, is:—

1. In a continuous brick molding machine, relatively movable and stationary parts forming continuous brick molds, pallets forming bottoms for said molds, means to feed and compress material in said molds, and automatic conveyor means to remove the pallets successively and strip the formed brick from the molds, said means acting to trowel two ends of the brick.

2. In a brick molding machine, molds formed by movable bottoms and ends co-acting with stationary sides, means to feed and compress material in the molds, means to trowel the top face of the brick, and conveyor means to strip the brick vertically between the end mold walls to trowel the ends of the brick.

3. In a continuous brick molding machine, a movable conveyor; molds formed by slotted end walls on the conveyor, removable pallets on the conveyor, and dividing blades working in the slots in the conveyor walls; means to feed and compress material in said molds; means to trowel the top face of the formed brick; and endless conveyor means to remove the pallets in a direction parallel with the end mold walls to trowel the ends of the bricks.

4. In a continuous brick molding machine, a conveyor, pallets thereon, means forming molds above the pallets, means to feed and compress material in the molds, and an endless moving conveyor disposed and operated means to strip the pallets with the formed brick thereon from the conveyor without cocking them.

5. In a continuous brick molding machine, a conveyor, pallets thereon, means forming molds on the pallets, means to feed and compress material in the molds, and a stripping conveyor to strip the pallets from the conveyor, said stripping conveyor being synchronized in its movement with the movement of the mold conveyor and disposed to strip the moving pallets vertically from the mold conveyor.

6. In a continuous brick molding machine, mechanism comprising movable and stationary parts forming traveling molds, means to feed a mixture to the molds, and a common hinged tamping bar extending the entire width of the machine for tamping said material into the mold, said tamping bar being inclined relatively to the moving molds to gradually perform its tamping duty as the molds approach it.

7. A continuous brick molding machine in accordance with claim 6, in which the tamping bar is hinged and provided at its lower hinged end with a substantially horizontal portion and has its main body portion sloped upwardly away from the approaching molds, and reciprocating mechanism connected to the free end of the tamping bar.

8. In a continuous brick molding machine, moving molds, means to feed and compress material into the molds, a stationary smoothing iron inclined in the direction of travel of the molds for troweling the top face of the brick in the molds, and means to flow a film of water over the under smoothing face of said iron.

9. In a continuous brick molding machine, a pallet conveyor composed of T-shaped flights having slitted vertical middle webs, and dividing blades working in said slots.

10. In a continuous brick molding machine, a pallet conveyor, rigidly mounted dividing blades set to work over the moving pallets, flights on the conveyor comprising vertical slotted walls to receive said blades, means to feed, compress and level the material to form bricks on the moving pallets, overhead connections to hold said blades in place, and means to attach said levelling means to the rear portions of said blades.

11. In a continuous brick molding machine, a plurality of flights forming a traveling conveyor and having each a longitudinal slotted vertical wall, movable pallets mounted on the flights between adjacent slotted walls, a series of dividing blades disposed to work in said slots, means to rigidly anchor the forward ends of the blades, means to feed and compress material in the molds, and a final smoothing iron rigidly connected to the rear ends of said blades.

12. In a continuous brick molding machine, a plurality of flights mounted on a traveling conveyor and having a longitudinal slotted vertical wall, movable pallets mounted on the flights between adjacent slotted walls, a series of dividing blades disposed to work in said slots, means to rigidly anchor the forward ends of the blades, means to feed and compress material in the molds, a V-shaped scraping blade rigidly mounted on the blades near their rear ends, and a final smoothing iron rigidly connected to the rear ends of the blades.

13. In a continuous brick molding machine, a pallet conveyor, a feed hopper, fixed blades working through the conveyor over the pallets and comprising outside converging side guide blades to form a chute for the mixture delivered from the hopper, and means to preliminarily tamp the material while between said guide blades.

14. In a continuous brick molding machine, traveling flights, pallets resting on the flights with their ends projecting beyond the ends of the flights, means to form bricks on the pallets, and an endless conveying and stripping means disposed to engage the ends of the pallets and strip them from the flights.

15. In a continuous brick molding machine, an endless pallet conveyor comprising flights having longitudinal slotted vertical walls, a series of dividing blades disposed in line with the travel of the flights, there being slots in said flight walls for the passage of the blades and notch outs at the ends of said walls and braces mounted lengthwise on the outside blades, and means to form brick on the pallets.

16. In a continuous brick molding machine, moving flights, a pallet chute, pallets having upturned end walls stacked in the chute, spring-pressed latches on the chute to normally engage and hold the forward edge of the bottom of the lowermost pallet in the chute, and means on the flights to trip said latches, the end walls of the pallet moving with the flights being adapted to co-operate with said latches in supporting the stack of pallets until it moves from under the chute.

17. In a continuous brick molding machine, endless chains, flights on the chains, means to apply and remove pallets from the flights, means to form brick on said pallets, a source of oil and water supply, and means to spray combined oil and water through a series of jets against the flights and chains after the removal of the pallets to clean and oil the flights.

18. A continuous brick molding machine comprising a traveling conveyor, wearing strips on which said conveyor slides, a main frame for supporting the machine, movable supports for the slides, and wedge means on the main frame for adjusting said supports.

In testimony whereof I affix my signature.

CLYDE H. BLISS.

Witness:
NOMIE WELSH.